(12) United States Patent
Yoshioka (10) Patent No.: US 7,021,138 B2
(45) Date of Patent: Apr. 4, 2006

(54) FUEL FEEDING APPARATUS

(75) Inventor: Hiroshi Yoshioka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/893,894

(22) Filed: Jul. 20, 2004

(65) Prior Publication Data

US 2005/0160806 A1  Jul. 28, 2005

(30) Foreign Application Priority Data

Jan. 27, 2004  (JP)  ............... 2004-018794

(51) Int. Cl.
*G01F 23/30* (2006.01)
(52) U.S. Cl. ............... 73/305; 73/309; 73/317
(58) Field of Classification Search ........... 73/305, 73/313, 317, 314
See application file for complete search history.

(56) References Cited

U.S. PATENT DOCUMENTS

| | | | | |
|---|---|---|---|---|
| 5,863,277 A | * | 1/1999 | Melbourne | 477/203 |
| 6,029,514 A | * | 2/2000 | Adam et al. | 73/149 |
| 6,367,325 B1 | * | 4/2002 | Schellenberg | 73/305 |
| 6,800,867 B1 | * | 10/2004 | Maier | 250/551 |
| 2001/0015201 A1 | * | 8/2001 | Pollock et al. | 126/41 R |
| 2004/0084608 A1 | * | 5/2004 | Maier | 250/221 |

FOREIGN PATENT DOCUMENTS

| JP | 2000-046626 A | 2/2000 |
|---|---|---|
| JP | 2001-356040 A | 12/2001 |

* cited by examiner

*Primary Examiner*—Thomas Moulis
(74) *Attorney, Agent, or Firm*—Sughrue Mion, PLLC (57) ABSTRACT

A fuel feeding apparatus is provided with a cap body for closing an opening of the tank, and a liquid level detector that is attached to the cap body and detects a liquid level of the fuel. The liquid level detector includes a floating unit immersed in the fuel and a strain gauge embedded in the floating unit in proximity to the cap body to detect a compression stress caused by buoyant force of the floating unit.

11 Claims, 8 Drawing Sheets

Fig. 9

FUEL FEEDING APPARATUS

BACKGROUND OF THE INVENTION

1. Field of the Invention

The present invention relates to a fuel feeding apparatus for feeding a fuel to an internal combustion engine, and more particularly, to the fuel feeding apparatus having a liquid level detector for detecting a liquid level of the fuel in a fuel tank.

2. Description of Related Art

Japanese laid opened patent publication 356040/2001 discloses a conventional fuel feeding apparatus having a fuel tank cap body that is provided with a filter-equipped pump, that is, a fuel pump integrated with a fuel filter. The fuel tank cap body is also provided with a fuel gauge consisting of a liquid level detector utilizing a hall element, an arm unit extending from the liquid level detector, and a floating unit provided on the end of the arm unit.

The fuel gauge, however, because of the structure in which the floating unit is fixed to the end of the arm unit, requires enough space for the arm unit to move with a turning-radius corresponding to a depth of the tank, causing the apparatus to upsize in structure. In addition, the structure of the arm unit and the floating unit, which are formed to be adaptable to the shape of the tank, becomes complicated, resulting in difficulties in assembling the fuel feeding apparatus.

Further, because the fuel gauge needs a movable mechanism for the arm unit, the life of a bearing unit shortens due to the wear thereof.

Japanese laid opened patent publication 46626/2000 discloses another example of the fuel feeding apparatus. In this type, a floating unit of approximately circular cylindrical shape is secured to a frame member on which a strain gauge is provided, thereby the strain gauge detecting a strain created by buoyant force of the floating unit.

This type of the fuel feeding apparatus is simplified and downsized in the structure, but requires the frame member. In addition, since the strain gauge provided on the frame member is used in the state that the strain gauge is exposed to the fuel liquid or vapor, the sulfur contents of the fuel increase the contact resistance, causing a detected value to be deviated.

SUMMARY OF THE INVENTION

In view of the foregoing, an object of the present invention is to overcome problems mentioned in the conventional structures.

Another object of the present invention is to provide a fuel feeding apparatus capable of detecting a liquid level of the fuel without using a large size arm or a frame member, improving the workability of assembling.

A further object of the present invention is to provide a fuel feeding apparatus capable of detecting a liquid level of the fuel without yielding loss of life in the movable mechanism and secular changes in a contact resistance, insuring reliability over the long run.

A fuel feeding apparatus according to the present invention includes a fuel tank cap body for closing an opening of a fuel tank and a liquid level detector provided on the fuel tank cap body for detecting a liquid level of the fuel. The liquid level detector is provided with a floating unit immersed in the fuel and a strain gauge embedded in the floating unit for detecting a compression distortion created in the floating unit by buoyant forces of the floating unit.

In the fuel feeding apparatus according to the invention in which the compression distortion created in the floating unit is detected by the strain gauge embedded in the floating unit, it is possible to downsize by eliminating necessity of the arm, and etc., improving working efficiency. Moreover, since the strain gauge is not exposed to the fuel liquid or vapor, it is possible to obtain a stable detecting value, ensuring reliability of the fuel feeding apparatus over the long run.

The foregoing and other objects, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1.

A first preferred embodiment of the present invention is described referring to following drawings hereinafter.

Figure 1:
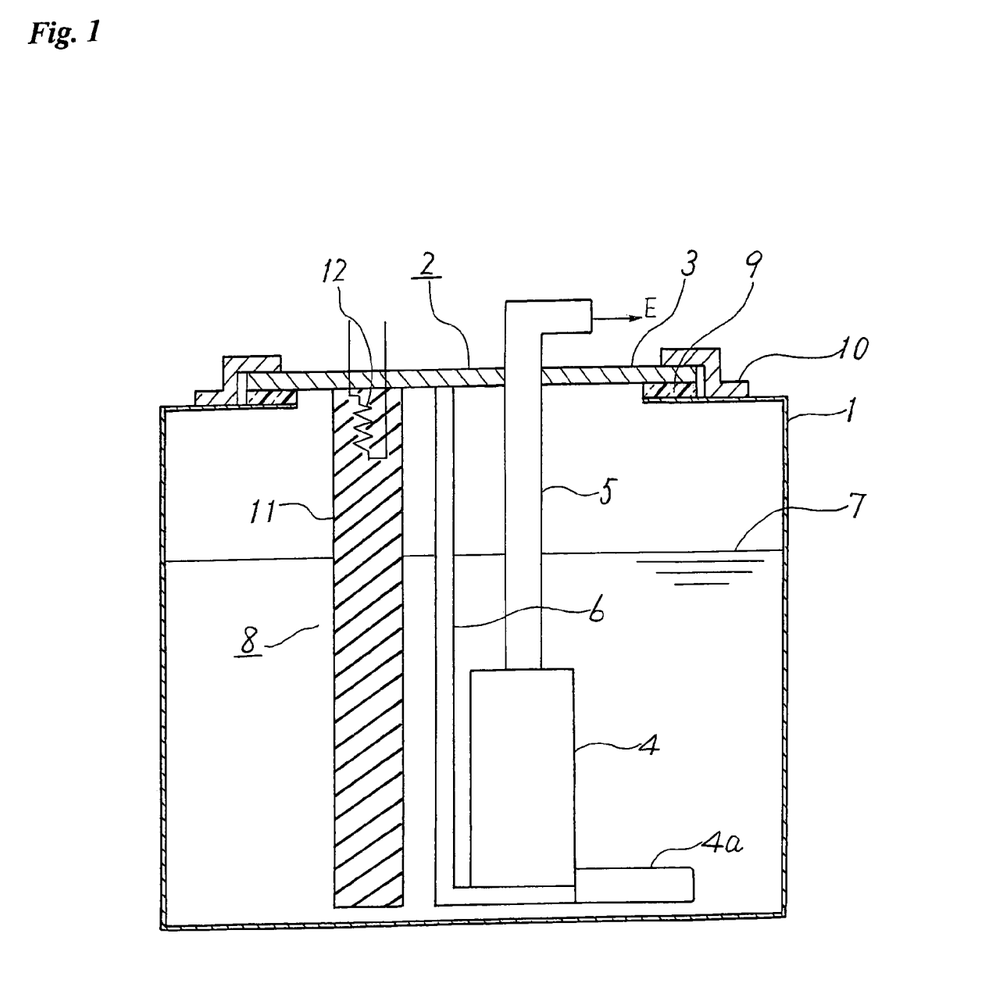
FIG. 1 is a schematic sectional view of a fuel feeding apparatus according to Embodiment 1 of the present invention.
Figure 2:
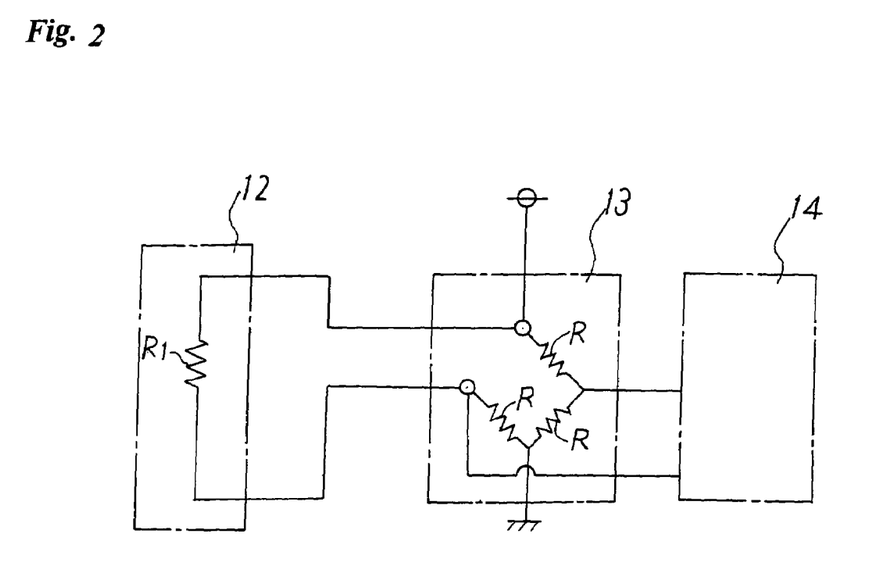
FIG. 2 is a block diagram showing a signal processing circuit for processing signals derived from a strain gauge in FIG. 1.

FIG. 1 is a schematic sectional view of a fuel feeding apparatus and FIG. 2 is a block diagram showing a signal processing circuit for processing signals derived from a strain gauge in FIG. 1.

In the FIG. 1, a fuel feeding apparatus 2 is provided in a tank 1 in which a fuel is reserved. The fuel feeding apparatus 2 is comprised of a cap body 3 for closing an opening provided on the top of the tank 1, a fuel pump 4 for sending a fuel sucked through a sucking filter 4a to an engine E (not shown) installed on the outside of the tank 1 through a fuel pipe 5, a supporting member 6 provided on the cap body 3 to support the fuel pump 4, and a liquid level detector 8 for detecting the fuel level in the tank 1. For hermetically sealing the cap body 3 to the tank 1, the cap body 3 is disposed between a plate 10 and the tank 1 via a gasket 9, and secured to the tank 1 by screws not shown in the drawing.

The liquid level detector 8 is composed of a well known-strain gauge (referring to e.g. Japanese laid opened patent publication 86619/1995) and a floating unit 11 made of e.g. a foam which creates large buoyant forces against the fuel and creates a compression strain by the buoyant forces. The floating unit 11 is fixed to a lower surface of the cap body 3, and the strain gauge 12 is disposed in the floating unit 11. The strain gauge 12 is sealed by a potting material such as an epoxy or polyurethane resin, or by an insert molding in the immediate neighborhood of the connecting part between the floating unit 11 and the cap body 3.

In the fuel feeding apparatus constructed as described above, when the liquid level in the fuel tank 1 becomes high, buoyant forces are created on the floating unit 11 in proportion to the amount of the fuel precluded by the floating unit 11. The buoyant forces create a compression strain in the floating unit 11, especially in the neighborhood of the cap body 3. The compression strain is detected by the strain gauge 12 provided in the floating unit 11 as mentioned above.

There are two type of strain gauges, that is, one is what a resistance change in a metal is used, the other a resistance change in a semiconductor. The both use strain gauges in such a way that the strain gauges are utilized as a resistance element of Wheatstone bridge circuit, in a principle in which, for instance, the resistance R1 becomes smaller when the strain gauge 12 is compressed to have a larger cross-sectional area S, and in reverse, the resistance R1 becomes larger when the strain gauge 12 is expanded to have a longer size L (R1=ρ·L/S).

In FIG. 2, the signal processing circuit is comprised of the mentioned strain gauge 12, a voltage detecting circuit 13 constituting Wheatstone bridge, and an output signal conversion circuit 14. The change in the resistance R1 as described above throws the bridge out of balance to generate a voltage (R means a fixed resistor). Such the change in voltage is detected by the voltage detecting circuit 13 and the detected voltage is processed by the output signal conversion circuit 14, such as amplification and the like, to be utilized as a liquid level-indication signal or alarming signal.

In the liquid level detector 8 according to the preferred embodiment constructed as described above, it is possible to detect the liquid level with a simple arrangement without using a large size arm or a frame member, resulting in downsizing and improvement in working efficiency in assembling.

Moreover, it is possible to eliminate a drop-off problem in performance caused by a wearing down of the bearing that is used in the movable mechanism of the arm.

It is also to be noted that the strain gauge 12, which is embedded in the floating unit 11, can be used in the state not exposed to the fuel liquid or vapor. This resolves the problems in which the sulfur contents of the fuel increase the contact resistance of the strain gauge 12, causing a detected value to be deviated.

Embodiment 2.

Figure 3:
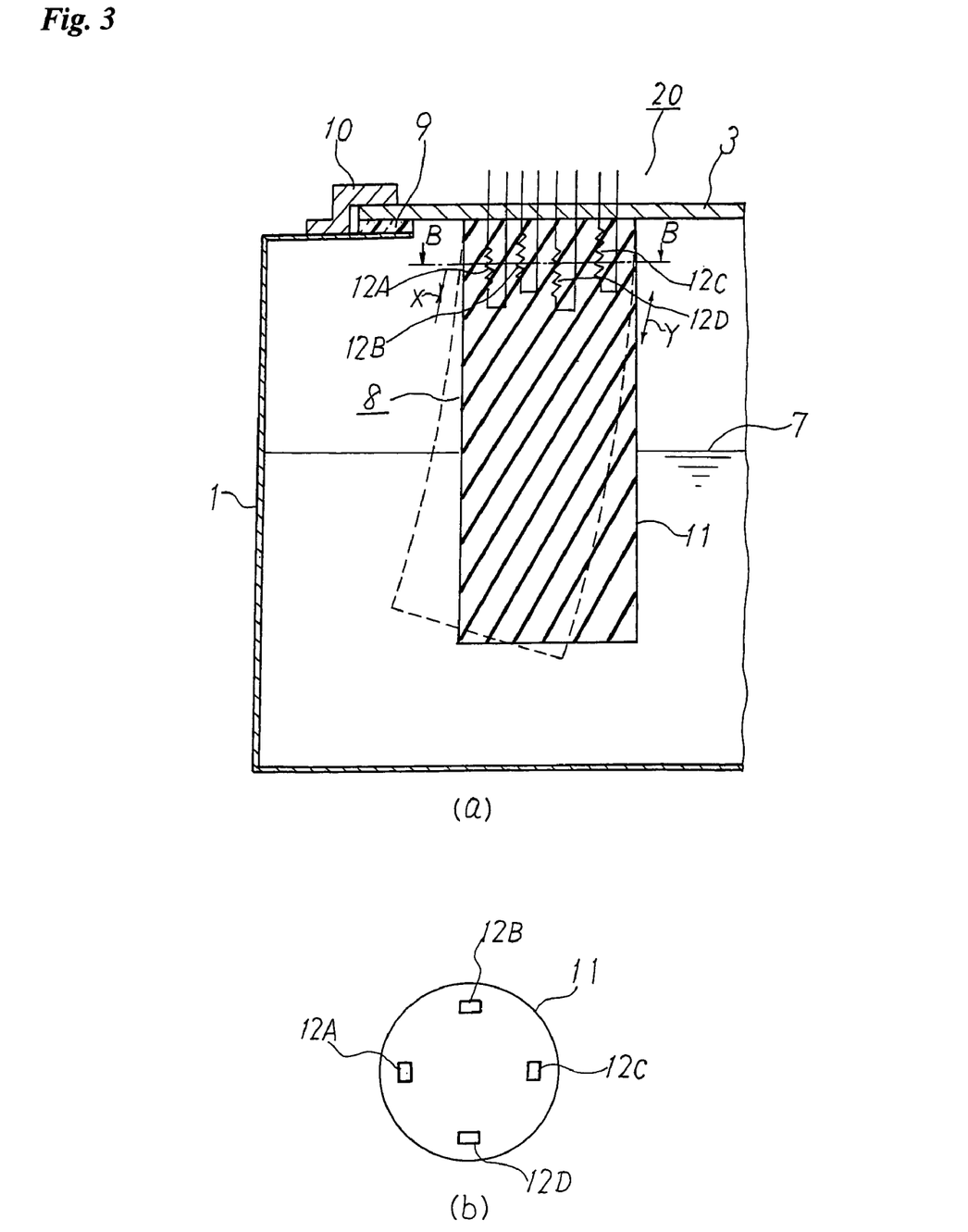
FIG. 3 is a schematic sectional view of the principal part of a fuel feeding apparatus according to Embodiment 2 of the present invention.

FIG. 3(a) is a schematic sectional view of the principal part of a fuel feeding apparatus according to the second preferred embodiment, and FIG. 3(b) is a sectional view taken on the line B—B of FIG. 3(a).

This embodiment is taking measures against a fact that vibrations of the fuel tank 1 due to a rough movement of the vehicle cause a bending stress to the floating unit 11.

FIGS. 3(a) and (b) show an example in which four strain gauges 12A to 12D are embedded at diametrically opposed positions in the floating unit 11 and in the immediate neighborhood of the connecting part between the floating unit 11 and the cap body 3. In a case where the distortion due to the bending stress is created as shown by the dotted line in FIG. 3(a), a compression force X is exerted on the left part of the floating unit 11 on the drawing, and an extension force Y on the right part. These stresses are detected by the four strain gauges 12A to 12D provided at diametrically opposed positions.

Figure 4:
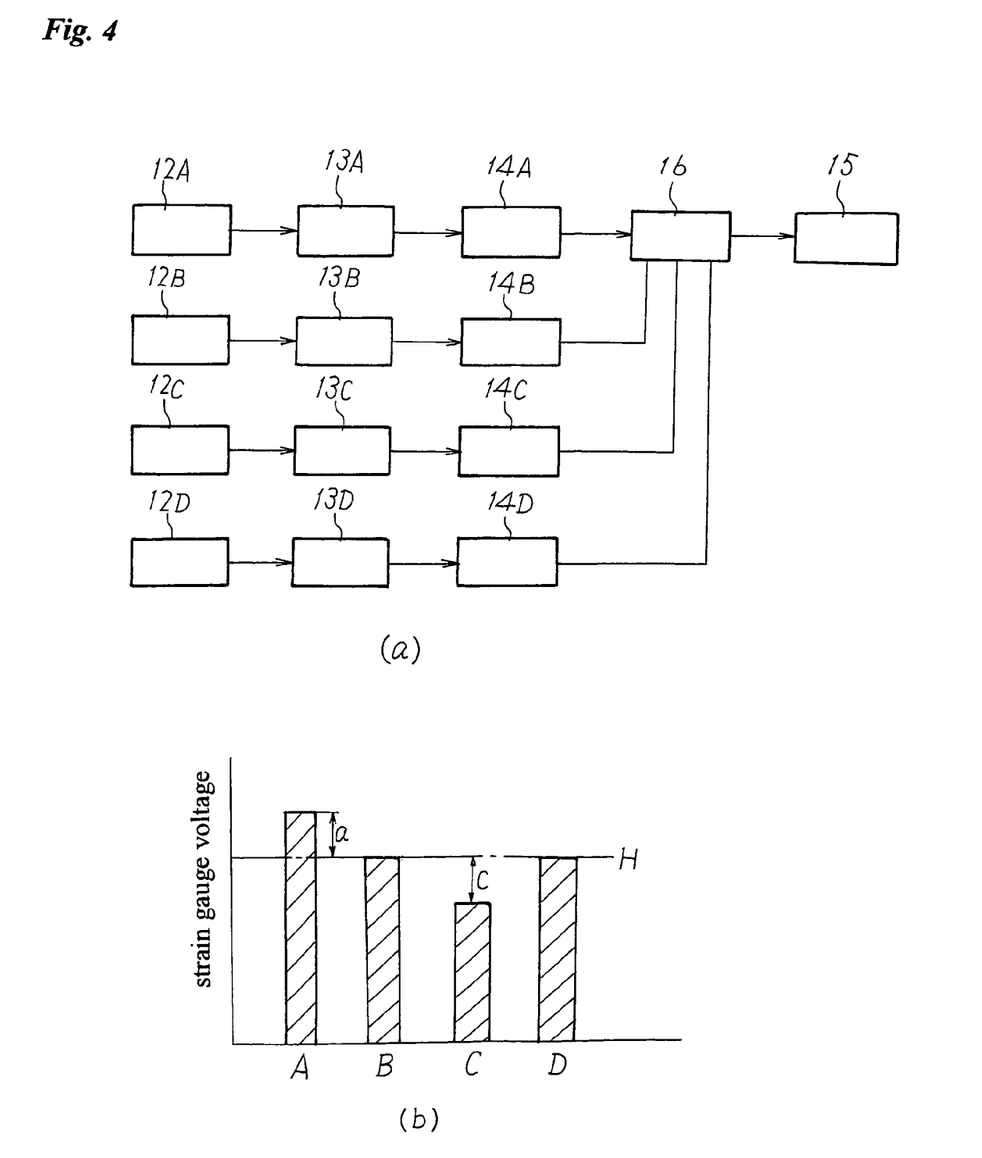
FIG. 4 is a block diagram showing a signal processing circuit for processing signals derived from a strain gauge in FIG. 2.

In FIG. 4(a) showing a signal processing circuit for processing signals derived from the mentioned strain gauges 12A to 12D, strain gauges 12A to 12D, voltage detecting circuits 13A to 13D, and output signal conversion circuits 14A to 14D are same with those shown in FIG. 2 respectively. Reference numeral 16 designates an averaging circuit.

When, the liquid level 7 in the fuel tank 1 in FIG. 3(a) becomes high, buoyant forces are exerted on the floating unit 11 in response to the amount of the fuel precluded by the floating unit 11 and create a compression strain in the floating unit 11 in the neighborhood of the cap body 3.

The compression distortion is detected by the strain gauge 12A to 12D provided in the floating unit 11, and the detected signals are processed by the voltage detecting circuit 13, the output signal conversion circuit 14, and the averaging circuit 16 as explained in FIG. 2. When the floating unit 11 is not subjected to any bending distortion, the compression distortion detected by each of the strain gauges 12A to 12D is approximately the same value one another.

On the other hand, when the floating unit 11 is subjected to some type of bending distortion, each strain gauge 12A to 12D detects the bending distortion, the detected signals are processed by the voltage detecting circuits 13A to 13D and the output signal conversion circuits 14A to 14D. Those processed signals are input to the averaging circuit 16 to average the signals from the output signal conversion circuits 14A to 14D, the output of the averaging circuit 16 is then input to the fuel level indicator 15 to show the fuel level.

FIG. 4(b) is a diagram for explaining the averaging process by the voltage detecting circuits 13A to 13D. In the drawing, the strain gauge A, being subjected to the compression force X due to the bending distortion, detects a voltage larger by "a" than a voltage "H" which corresponds to buoyant forces in a condition being not subjected to the bending distortion. The strain gauge C, being subjected to the extension force Y due to the bending distortion, on the contrary, detects a voltage smaller by "c" than the voltage "H". The strain gauges B and D detect respectively a voltage "H" which corresponds to the compression force due to buoyant forces in a normal condition. These voltages are averaged by the averaging circuit 16 to cancel effects of the bending distortion one another, enabling to detect a liquid level of the fuel accurately.

In the aforementioned embodiment, since four strain gauges are disposed at the diametrically opposed positions, it is possible to cancel the effects of the bending distortions on the same principle in any direction of the bending distortion.

In the above embodiment, any number of the strain gauges can be selected and used.

Embodiment 3.

Figure 5:
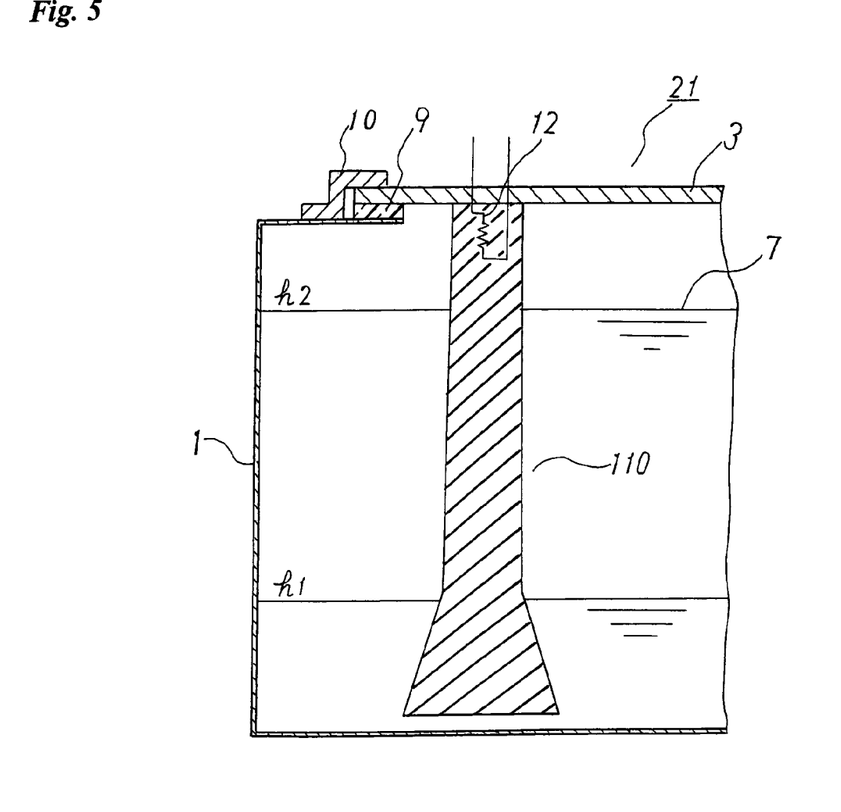
FIG. 5 is a schematic sectional view of the principal part of a fuel feeding apparatus according to Embodiment 3 of the present invention.

FIG. 5 is a schematic sectional view showing a principal part of a fuel feeding apparatus according to the third preferred embodiment of the present invention. FIG. 5 is the same with the fuel feeding apparatus according to the Embodiment 1 except that the shape of the floating unit 110 is formed so that its sectional area is increased as it closes to the bottom of the tank 1. The fuel feeding apparatus 21 according to this embodiment is designed so that the amount of the fuel precluded by the floating unit 110 increases as the liquid level decreases, that is, buoyant forces acting to the floating unit 110 becomes larger as the liquid level decreases. It is possible therefore to increase the output of the strain gauge 12 embedded in upper part of the floating unit 110 as the liquid level decreases, improving an accuracy for detecting the liquid level to surely prevent the shortage in fuel.

Figure 6:
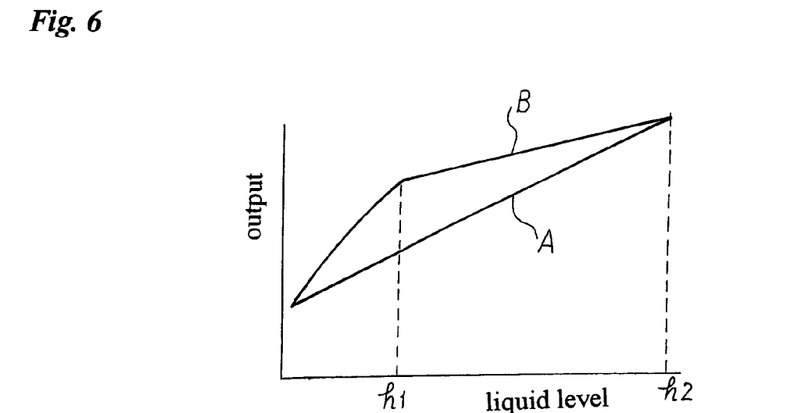
FIG. 6 is a graph showing a comparison between Embodiments 1 and 3 in a detecting accuracy of the liquid level.

FIG. 6 is a graph showing a comparison in a detecting accuracy of the liquid level between Embodiments 1 and 3, with the liquid level as the horizontal coordinate axis and the output of the voltage detecting circuit 13 as the vertical coordinate axis.

As understood from the graph, when the floating unit 11 has a constant dimension over whole length from the top to the bottom of the tank as shown in FIG. 1, the output of the voltage detecting circuit 13 draws a linear straight line A having a constant change rate. However, when the floating unit 110 has the shape as shown in FIG. 5, a change rate of the output is high enough until the height h1 and is lower at the higher level as shown in the line B. As a result, it is possible for the liquid level detector to perform at higher accuracy in the low range of the fuel level.

Embodiment 4.

Figure 7:
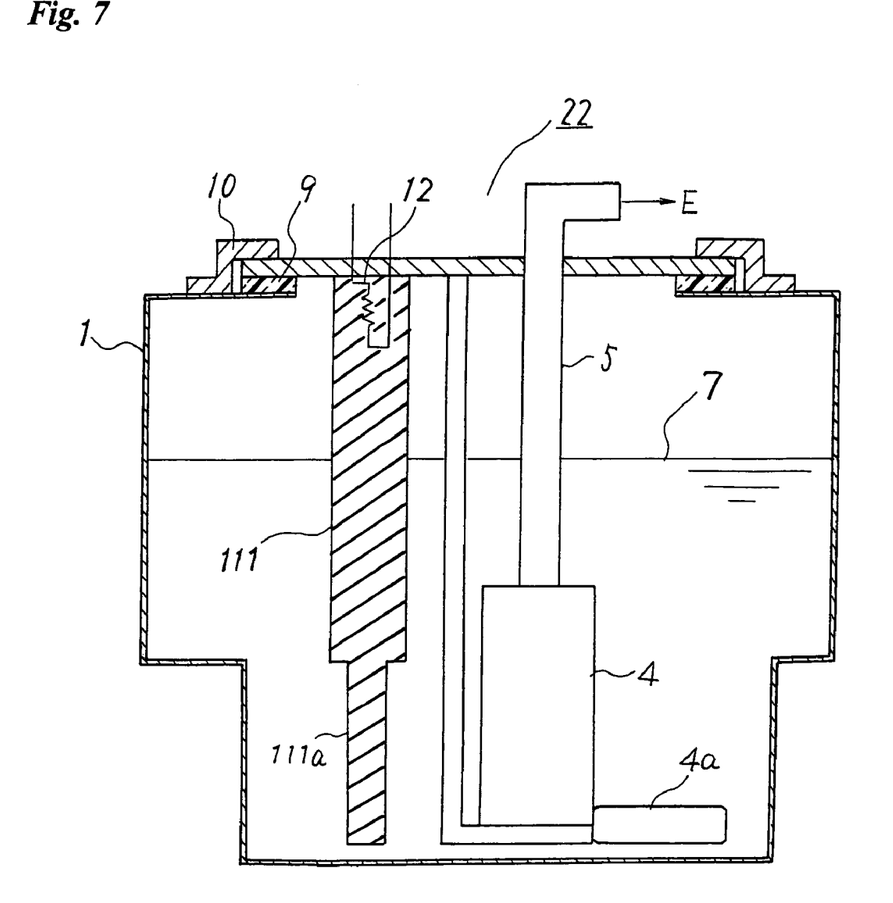
FIG. 7 is a schematic sectional view of the principal part of a fuel feeding apparatus according to Embodiment 4 of the present invention.

FIG. 7 is a schematic sectional view of a fuel feeding apparatus 22 according to the fourth embodiment of the present invention. FIG. 7 is the same with the fuel feeding apparatus according to the Embodiment 1 except that the shape of the floating unit 111 is formed so that its sectional area is changed in accordance with the shape of the tank 1.

In general, since the outside shape of the tank 1 is not a rectangular box, at the time when the fuel level 7 goes down based on the fuel consumption, the amount of the fuel and the fuel level do not necessarily show the direct proportionality between them. In the conventional fuel level detector using a variable resister, consequently, the variable rate of the resister has been changed in accordance with the shape of the fuel tank.

This embodiment is provided with a recessed portion 111*a* in the floating unit 111 if the tank 1 has a recess at the lower part. Changing the sectional area of the floating unit 111 according to the change in the fuel volume, therefore, makes it possible to generate a change in buoyant forces consistent with the fuel volume.

Embodiment 5.

Figure 8:
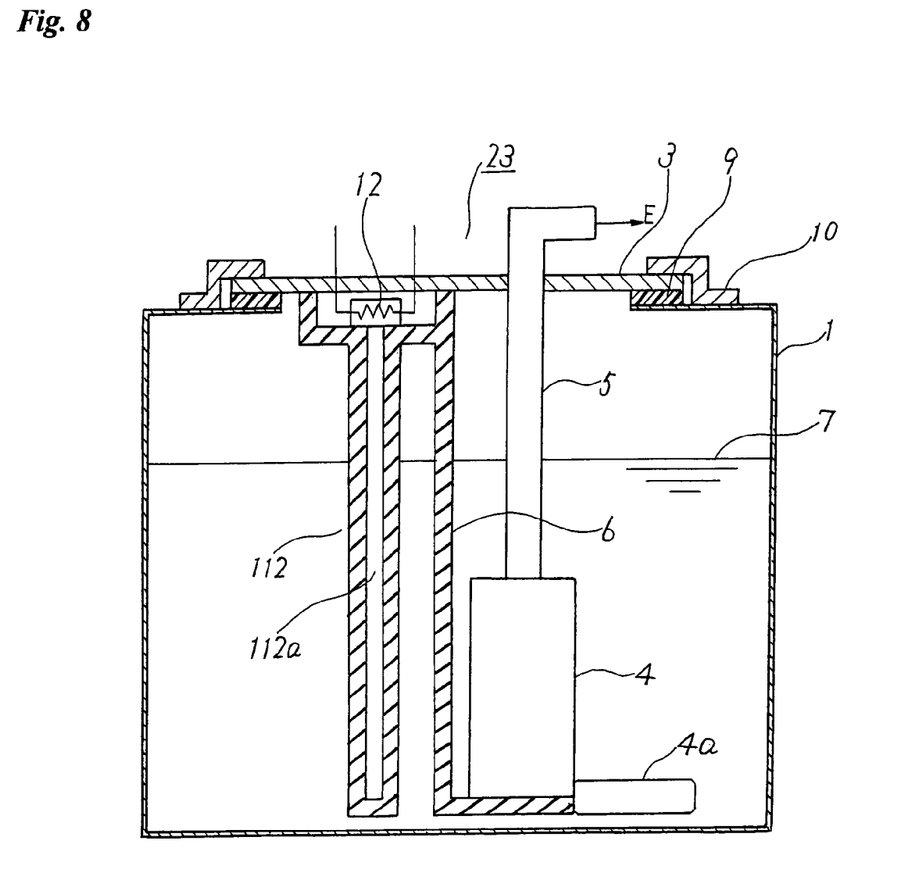
FIG. 8 is a schematic sectional view of the principal part of a fuel feeding apparatus according to Embodiment 5 of the present invention.

FIG. 8 is a schematic sectional view of a fuel feeding apparatus according to the fifth embodiment of the present invention. In this embodiment, a floating unit 112 is provided with a hollow air-filled room 112*a* in it, and is integrally constituted with the supporting member 6 of the fuel pump 4. The floating unit 112 is made of a synthetic resin, for example.

With this construction, it is not necessary to provide the floating unit separately, since the hollow air-filled room 112*a* creates buoyant force. In this case, the fuel level 7 can be detected by providing the strain gauge 12 on the upper part of the hollow air-filled room 112*a*. As described above, the strain gauge 12 in this embodiment is embedded in the floating unit 112 and is utilized without being exposed to the fuel liquid or vapor. Therefore, it is possible to resolve the problem that the strain gauge 12 is affected by the sulfur contents of the fuel, causing a detected value to be deviated.

Embodiment 6.

Figure 9:
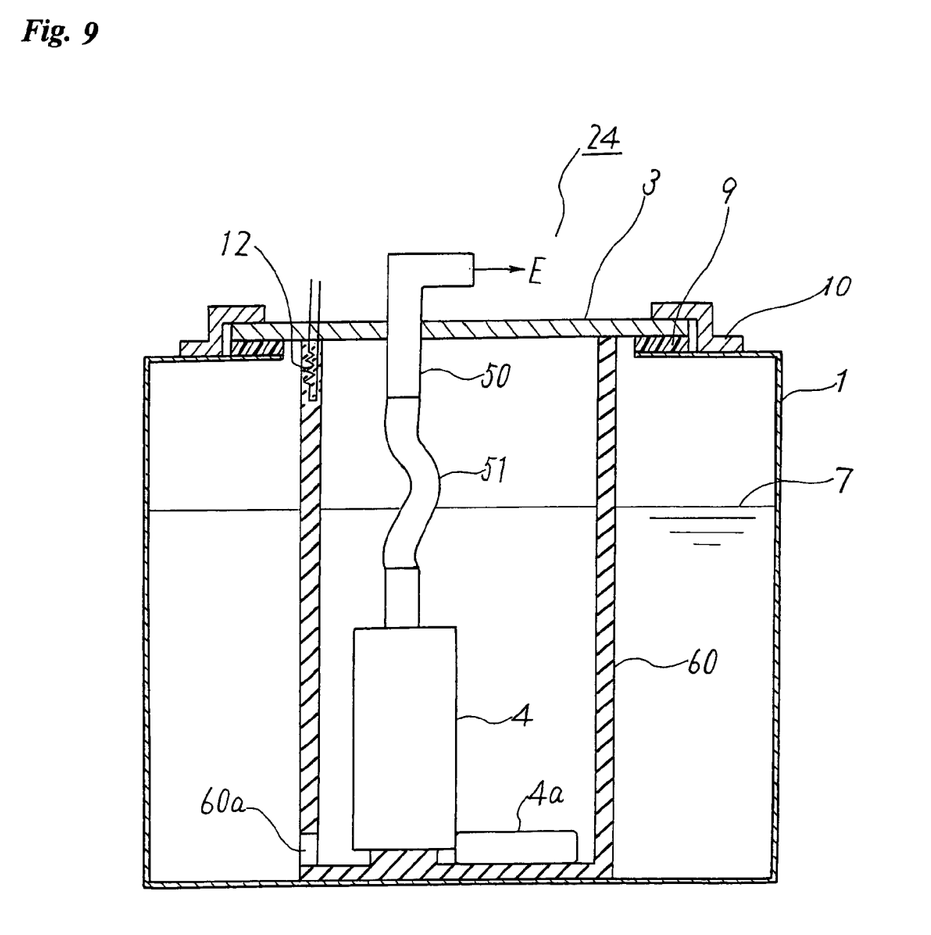
FIG. 9 is a schematic sectional view of the principal part of a fuel feeding apparatus according to Embodiment 6 of the present invention.

FIG. 9 is a schematic sectional view of a fuel feeding apparatus according to the sixth embodiment of the present invention.

A fuel feeding apparatus 24 in this embodiment is comprised of a fuel hose 51 connected to an outlet of the fuel pump 4, a fuel pipe 50 connected to a fuel hose 51 and supported by the cap body 3, and a fuel reservoir 60 reserving the fuel taken in through an inlet 60*a*. The fuel reservoir 60 supports the fuel pump 4 and the strain gauge 12 is embedded in the fuel reservoir 60 in the proximity of the cap body 3. The fuel reservoir 60 prevents a sucking filter 4*a* of the fuel pump 4 from exposing to the air and prevents the fuel from disabling to deliver, due to fuel movement to the periphery of the tank 1 when the vehicle makes hard cornering with the small amount of fuel remaining in the tank 1.

The fuel reservoir 60 is made of material, e.g. expandable resin, which has the property of creating large buoyant forces against the fuel. The buoyant forces act on the fuel reservoir 60 in the immediate neighborhood of the cap body 3 in response to the amount of fuel precluded by the fuel reservoir 60, creating a compression strain in the fuel reservoir 60. The strain gauge 12 embedded in the fuel reservoir 60 measures the compression strain to detect the fuel level.

As described above, this embodiment renders the fuel reservoir 60 operative as a floating unit, enabling to avoid the necessity for providing a floating unit separately.

Furthermore, when the fuel reservoir 60 is made of a hollow synthetic resin, it is possible to improve the supporting strength of the fuel pump 4 while securing buoyant forces.

Whereas many alterations and modifications of the present invention will no doubt become apparent to a person of ordinary skill in the art after having read the foregoing description, it is to be understood that the particular embodiment shown and described by way of illustration is in no way intended to limit the scope of the claims which in themselves recite only those features regarded as essential to the invention.

What is claimed is:

1. A fuel feeding apparatus comprising:
 a tank for reserving fuel;
 a cap body for closing an opening of the tank; and
 a liquid level detecting device attached to the cap body and detects a liquid level of the fuel,
 wherein said liquid level detecting device comprises:
  a floating unit immersed in the fuel; and
  a strain gauge embedded in the floating unit in the neighborhood of the cap body to detect a compression stress exerted by buoyant forces of the floating unit.

2. A fuel feeding apparatus according to claim 1, wherein said floating unit is formed with an expandable resin.

3. A fuel feeding apparatus according to claim 1, wherein a plurality of strain gauges are disposed at diametrically opposed positions in the floating unit.

4. A fuel feeding apparatus according to claim 1, wherein said floating unit has a shape in which its sectional area increases as it closes to the bottom of the tank.

5. A fuel feeding apparatus according to claim 1, wherein said floating unit has a sectional area in accordance with the shape of the tank.

6. A fuel feeding apparatus according to claim 1, wherein said floating unit is made of a hollow synthetic resin and has an air-filled room.

7. A fuel feeding apparatus according to claim 1, wherein said floating unit is integrally constituted with a supporting member of a fuel pump.

8. A fuel feeding apparatus comprising:
   a tank for reserving fuel;
   a cap body for closing an opening of the tank; and
   a fuel reservoir attached to the cap body and installing a fuel pump,
   wherein said fuel reservoir is constituted so as to exert buoyant forces by the fuel and to embed a strain gauge for detecting a compression stress caused by the buoyant forces in proximity to the cap body.

9. A fuel feeding apparatus according to claim 8, wherein said fuel reservoir is formed with an expandable resin.

10. The fuel feeding apparatus according to claim 1, wherein said floating unit is fixed to a lower surface of the cap body.

11. The fuel feeding apparatus according to claim 1, wherein said strain gauge is located in an immediate neighborhood between the floating unit and the cap body.

* * * * *